(12) United States Patent
Kirby et al.

(10) Patent No.: US 8,452,235 B2
(45) Date of Patent: May 28, 2013

(54) TRACKING RECEIVER DEVICES WITH WIRELESS POWER SYSTEMS, APPARATUSES, AND METHODS

(75) Inventors: Miles Alexander Lyell Kirby, San Diego, CA (US); Anne Katrin Konertz, Solana Beach, CA (US); Virginia Walker Keating, San Diego, CA (US); Craig Lauer, San Diego, CA (US); Michael John Mangan, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 508 days.

(21) Appl. No.: 12/572,369

(22) Filed: Oct. 2, 2009

(65) Prior Publication Data

US 2010/0248622 A1 Sep. 30, 2010

Related U.S. Application Data

(60) Provisional application No. 61/164,410, filed on Mar. 28, 2009.

(51) Int. Cl.
*H04B 5/00* (2006.01)

(52) U.S. Cl.
USPC ....... 455/41.1; 455/453; 455/574; 455/67.16; 455/83; 455/277.1; 455/263; 455/253.2; 307/104; 320/106; 320/108

(58) Field of Classification Search
USPC ............ 455/41.1, 66.1, 83, 277.1, 86, 67.16, 455/263, 253.2, 574; 307/104; 705/1.1, 400, 705/26.1; 320/106, 108; 363/21.02
See application file for complete search history.

(56) References Cited

U.S. PATENT DOCUMENTS

| | | | |
|---|---|---|---|
| 6,825,620 B2* | 11/2004 | Kuennen et al. | 315/224 |
| 7,180,248 B2* | 2/2007 | Kuennen et al. | 315/224 |
| 7,385,357 B2* | 6/2008 | Kuennen et al. | 315/224 |
| 7,489,102 B2* | 2/2009 | Purdy et al. | 320/106 |
| 7,714,534 B2* | 5/2010 | Bayne et al. | 320/106 |
| 7,737,657 B2* | 6/2010 | Fischer et al. | 320/111 |

(Continued)

FOREIGN PATENT DOCUMENTS

EP 1734635 A2 12/2006

OTHER PUBLICATIONS

International Search Report and Written Opinion—PCT/US2010/028742, ISA/EPO—Jul. 6, 2011.

*Primary Examiner* — Marceau Milord
(74) *Attorney, Agent, or Firm* — Knobbe, Martens, Olsen & Bear LLP

(57) ABSTRACT

Exemplary embodiments are directed to communicating information relating to wireless charging. A power transmitting system includes a host device with a transmit antenna. A communication interface conveys receiver information, which includes unique identifier information, from a receiver device to the host device. A controller on the host device monitors and processes the receiver information to generate notification information, which is presented to a user on a user-perceivable notifier. The transmit antenna generates an electromagnetic field at a resonant frequency to create a coupling-mode region within a near-field of the transmit antenna. The system can detect a presence of a receiver device with a receive antenna that is in the coupling-mode region and process a request for power from the receiver device. The system can also notify a user when a host device is leaving a designated region and whether the host device includes expected receiver devices.

39 Claims, 13 Drawing Sheets

U.S. PATENT DOCUMENTS

| | | | |
|---|---|---|---|
| 7,761,307 B2* | 7/2010 | Ochi et al. | 705/1.1 |
| 7,772,802 B2* | 8/2010 | Manico et al. | 320/108 |
| 7,923,971 B2* | 4/2011 | Kojima | 320/163 |
| 7,996,238 B2* | 8/2011 | Ochi et al. | 705/1.1 |
| 2005/0206346 A1 | 9/2005 | Smith et al. | |
| 2008/0258679 A1 | 10/2008 | Manico et al. | |
| 2009/0015210 A1 | 1/2009 | Kojima | |
| 2009/0079271 A1* | 3/2009 | Jin | 307/104 |

* cited by examiner

TRACKING RECEIVER DEVICES WITH WIRELESS POWER SYSTEMS, APPARATUSES, AND METHODS

CLAIM OF PRIORITY UNDER 35 U.S.C. §119

This application claims priority under 35 U.S.C. §119(e) to:

U.S. Provisional Patent Application 61/164,410 entitled "TRACKING OBJECTS LOCATED WITHIN WIRELESS CHARGING SYSTEMS" filed on Mar. 28, 2009, and assigned to the assignee hereof and hereby expressly incorporated by reference herein.

BACKGROUND

1. Field

The present invention relates generally to wireless charging, and more specifically to devices, systems, and methods related to tracking receiver devices that may be located in wireless power systems.

2. Background

Typically, each battery powered device such as a wireless electronic device requires its own charger and power source, which is usually an alternating current (AC) power outlet. Such a wired configuration becomes unwieldy when many devices need charging.

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects the radiated power and rectifies it for charging the battery. Antennas are generally of resonant length in order to improve the coupling efficiency. This approach suffers from the fact that the power coupling falls off quickly with distance between the antennas, so charging over reasonable distances (e.g., less than 1 to 2 meters) becomes difficult. Additionally, since the transmitting system radiates plane waves, unintentional radiation can interfere with other systems if not properly controlled through filtering.

Other approaches to wireless energy transmission techniques are based on inductive coupling between a transmit antenna embedded, for example, in a "charging" mat or surface and a receive antenna (plus a rectifying circuit) embedded in the host electronic device to be charged. This approach has the disadvantage that the spacing between transmit and receive antennas must be very close (e.g., within thousandths of meters). Though this approach does have the capability to simultaneously charge multiple devices in the same area, this area is typically very small and requires the user to accurately locate the devices to a specific area. Therefore, there is a need to provide a wireless charging arrangement that accommodates flexible placement and orientation of transmit and receive antennas.

With wireless power transmission there is a need for systems and methods for transmitting and relaying wireless power for convenient and unobtrusive wireless power transmission to receiver devices. There is also a need for tracking and reporting on receiver devices that may or may not be within a wireless charging zone.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
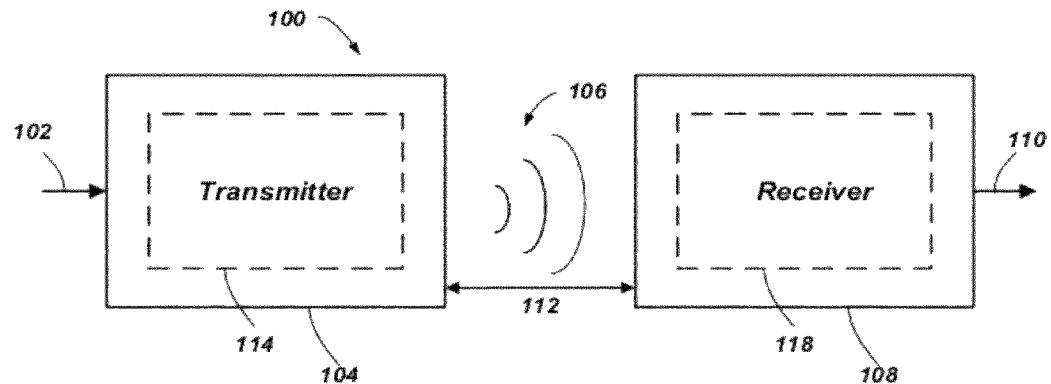
FIG. 1 shows a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are exactly identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
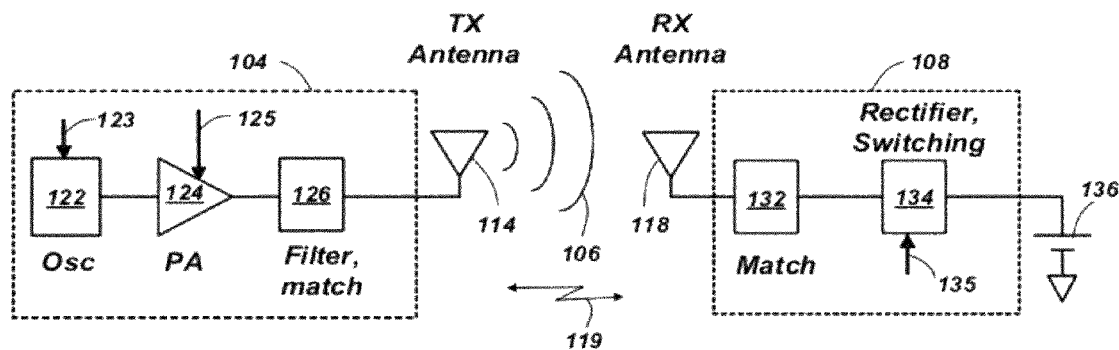
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver may include a matching circuit 132 and a rectifier and switching circuit to generate a DC power output to charge a battery 136 as shown in FIG. 2 or power a device coupled to the receiver (not shown). The matching circuit 132 may be included to match the impedance of the receiver 108 to the receive antenna 118.

Figure 3:
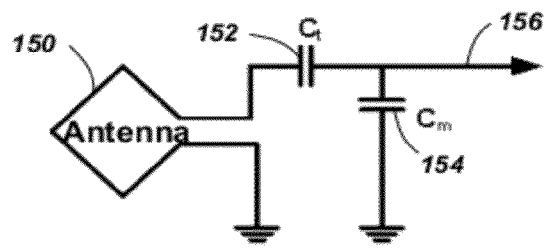
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

Figure 4:
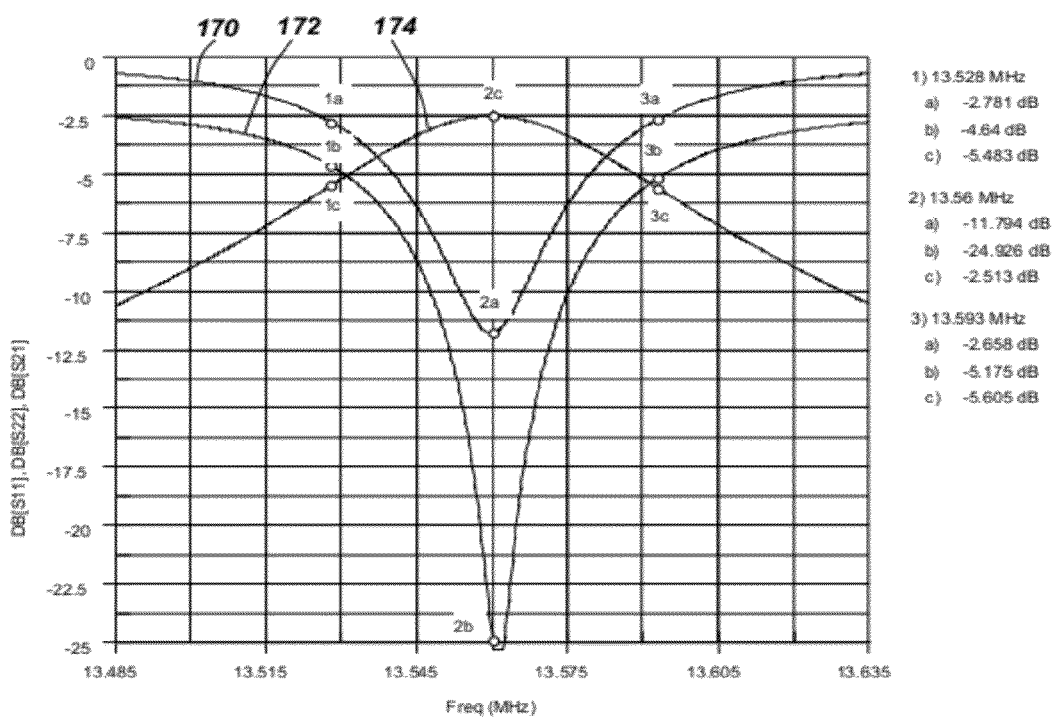
FIG. 4 shows simulation results indicating coupling strength between transmit and receive antennas.

FIG. 4 shows simulation results indicating coupling strength between transmit and receive antennas. Curves 170 and 172 indicate a measure of acceptance of power by the transmit and receive antennas, respectively. In other words, with a large negative number there is a very close impedance match and most of the power is accepted and, as a result, radiated by the transmit antenna. Conversely, a small negative number indicates that much of the power is reflected back from the antenna because there is not a close impedance match at the given frequency. In FIG. 4, the transmit antenna and the receive antenna are tuned to have a resonant frequency of about 13.56 MHz.

Curve 170 illustrates the amount of power transmitted from the transmit antenna at various frequencies. Thus, at points 1a and 3a, corresponding to about 13.528 MHz and 13.593 MHz, much of the power is reflected and not transmitted out of the transmit antenna. However, at point 2a, corresponding to about 13.56 MHz, it can be seen that a large amount of the power is accepted and transmitted out of the antenna.

Similarly, curve 172 illustrates the amount of power received by the receive antenna at various frequencies. Thus, at points 1b and 3b, corresponding to about 13.528 MHz and 13.593 MHz, much of the power is reflected and not conveyed through the receive antenna and into the receiver. However, at point 2b corresponding to about 13.56 MHz, it can be seen that a large amount of the power is accepted by the receive antenna and conveyed into the receiver.

Curve 174 indicates the amount of power received at the receiver after being sent from the transmitter through the transmit antenna, received through the receive antenna and conveyed to the receiver. Thus, at points 1c and 3c, corresponding to about 13.528 MHz and 13.593 MHz, much of the power sent out of the transmitter is not available to the receiver because (1) the transmit antenna rejects much of the power sent to it from the transmitter and (2) the coupling between the transmit antenna and the receive antenna is less efficient as the frequencies move away from the resonant frequency. However, at point 2c corresponding to about 13.56 MHz, it can be seen that a large amount of the power sent from the transmitter is available at the receiver, indicating a high degree of coupling between the transmit antenna and the receive antenna.

Figure 5A:
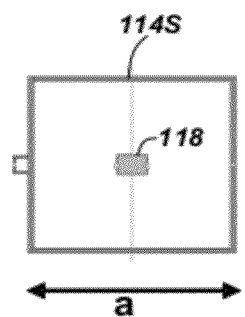
FIGS. 5A and 5B show layouts of loop antennas for transmit and receive antennas according to exemplary embodiments of the present invention.
Figure 5B:
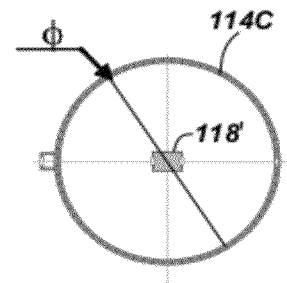

FIGS. 5A and 5B show layouts of loop antennas for transmit and receive antennas according to exemplary embodiments of the present invention. Loop antennas may be configured in a number of different ways, with single loops or multiple loops at wide variety of sizes. In addition, the loops may be a number of different shapes, such as, for example only, circular, elliptical, square, and rectangular. FIG. 5A illustrates a large square loop transmit antenna 114S and a small square loop receive antenna 118 placed in the same plane as the transmit antenna 114S and near the center of the transmit antenna 114S. FIG. 5B illustrates a large circular loop transmit antenna 114C and a small square loop receive antenna 118' placed in the same plane as the transmit antenna 114C and near the center of the transmit antenna 114C. The square loop transmit antenna 114S has side lengths of "a" while the circular loop transmit antenna 114C has a diameter of "0." For a square loop, it can be shown that there is an equivalent circular loop whose diameter may be defined as: $\Phi_{eq} = 4a/\pi$.

Figure 6:
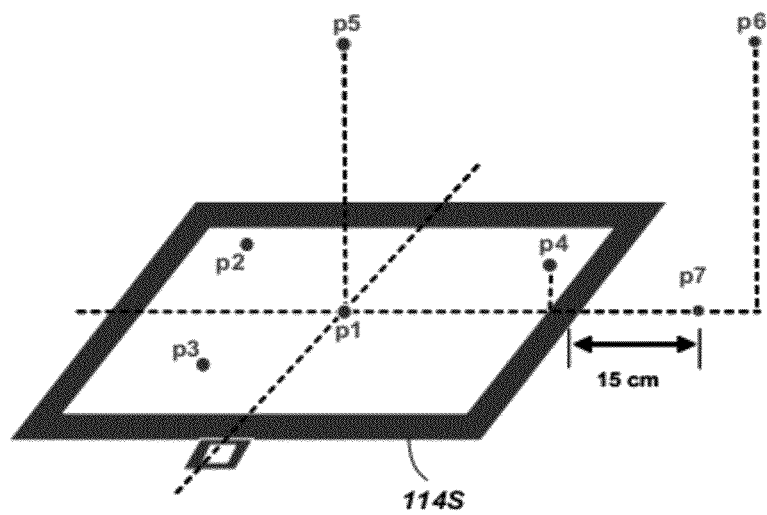
FIG. 6 shows various placement points for a receive antenna relative to a transmit antenna to illustrate coupling strengths in coplanar and coaxial placements.

FIG. 6 shows various placement points for a receive antenna relative to a transmit antenna to illustrate coupling strengths in coplanar and coaxial placements. "Coplanar," as used herein, means that the transmit antenna and receive antenna have planes that are substantially aligned (i.e., have surface normals pointing in substantially the same direction) and with no distance (or a small distance) between the planes of the transmit antenna and the receive antenna. "Coaxial," as used herein, means that the transmit antenna and receive antenna have planes that are substantially aligned (i.e., have surface normals pointing in substantially the same direction) and the distance between the two planes is not trivial and furthermore, the surface normal of the transmit antenna and the receive antenna lie substantially along the same vector, or the two normals are in echelon.

As examples, points p1, p2, p3, and p7 are all coplanar placement points for a receive antenna relative to a transmit antenna. As another example, point p5 and p6 are coaxial placement points for a receive antenna relative to a transmit antenna. The table below shows coupling strength (S21) and coupling efficiency (expressed as a percentage of power transmitted from the transmit antenna that reached the receive antenna) at the various placement points (p1-p7) illustrated in FIG. 6.

TABLE 1

| Position | Distance from plane (cm) | S21 efficiency (%) | Efficiency (TX DC power in to RX DC power out) |
| --- | --- | --- | --- |
| p1 | 0 | 46.8 | 28 |
| p2 | 0 | 55.0 | 36 |
| p3 | 0 | 57.5 | 35 |
| p4 | 2.5 | 49.0 | 30 |
| p5 | 17.5 | 24.5 | 15 |
| p6 | 17.5 | 0.3 | 0.2 |
| p7 | 0 | 5.9 | 3.4 |

As can be seen, the coplanar placement points p1, p2, and p3, all show relatively high coupling efficiencies. Placement point p7 is also a coplanar placement point, but is outside of the transmit loop antenna. While placement point p7 does not have a high coupling efficiency, it is clear that there is some coupling and the coupling-mode region extends beyond the perimeter of the transmit loop antenna.

Placement point p5 is coaxial with the transmit antenna and shows substantial coupling efficiency. The coupling efficiency for placement point p5 is not as high as the coupling efficiencies for the coplanar placement points. However, the coupling efficiency for placement point p5 is high enough that substantial power can be conveyed between the transmit antenna and a receive antenna in a coaxial placement.

Placement point p4 is within the circumference of the transmit antenna but at a slight distance above the plane of the transmit antenna in a position that may be referred to as an offset coaxial placement (i.e., with surface normals in substantially the same direction but at different locations) or offset coplanar (i.e., with surface normals in substantially the same direction but with planes that are offset relative to each other).

From the table it can be seen that with an offset distance of 2.5 cm, placement point p4 still has relatively good coupling efficiency.

Placement point p6 illustrates a placement point outside the circumference of the transmit antenna and at a substantial distance above the plane of the transmit antenna. As can be seen from the table, placement point p7 shows little coupling efficiency between the transmit and receive antennas.

Figure 7:
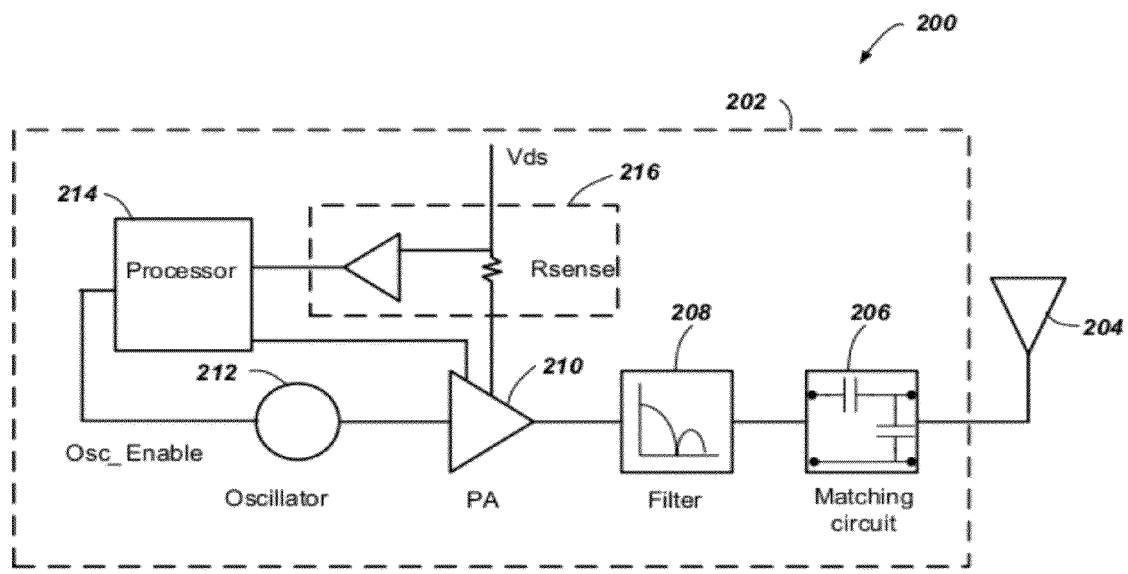
FIG. 7 is a simplified block diagram of a transmitter, in accordance with an exemplary embodiment of the present invention.

FIG. 7 is a simplified block diagram of a transmitter, in accordance with an exemplary embodiment of the present invention. A transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a processor 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by processor 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

Figure 8:
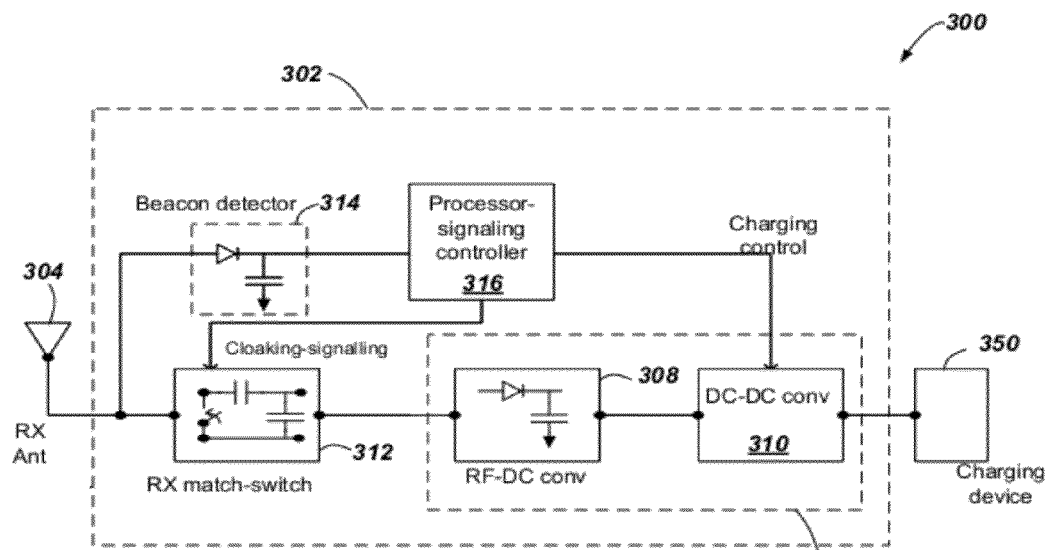
FIG. 8 is a simplified block diagram of a receiver, in accordance with an exemplary embodiment of the present invention.

FIG. 8 is a block diagram of a receiver, in accordance with an exemplary embodiment of the present invention. A receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 7). Receive antenna 304 may be similarly dimensioned with transmit antenna 204 or may be differently sized based upon the dimensions of an associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2) as is explained more fully below. As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 µsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 9:
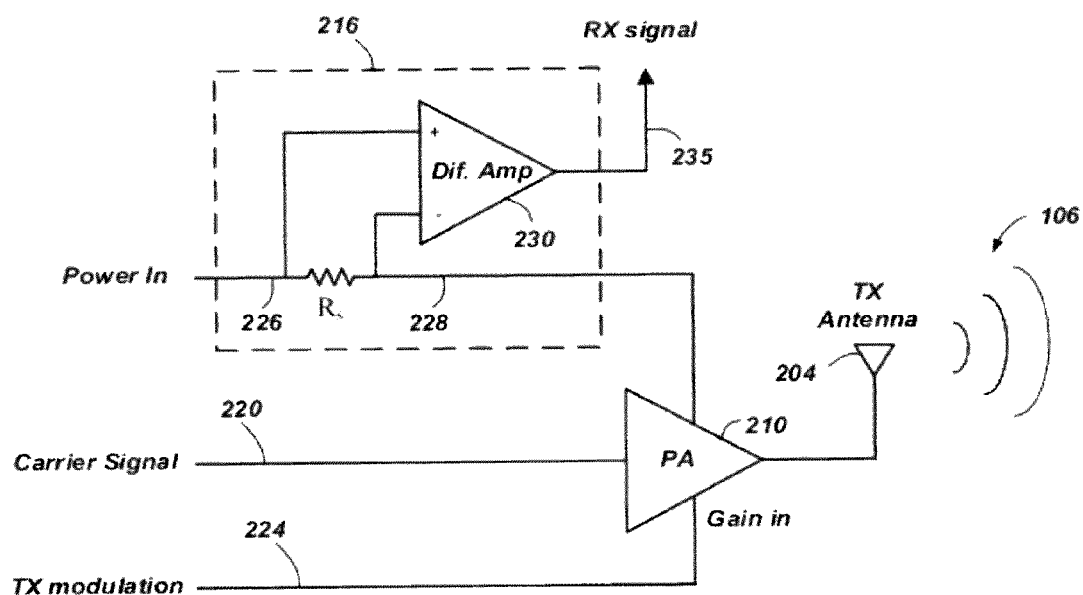
FIG. 9 shows a simplified schematic of a portion of transmit circuitry for carrying out messaging between a transmitter and a receiver.

FIG. 9 shows a simplified schematic of a portion of transmit circuitry for carrying out messaging between a transmitter and a receiver. In some exemplary embodiments of the present invention, a means for communication may be enabled between the transmitter and the receiver. In FIG. 9 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 9 also includes a load sensing circuit 216 that supplies power to the power amplifier 210 and generates a receive signal 235 output. In the load sensing circuit 216 a voltage drop across resistor Rs develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 9) the amount of current drawn by the power amplifier 210 will change. In other words, if no coupled mode resonance exist for the transmit antenna 210, the power required to drive the radiated field will be first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna, as explained below. Additionally, a change in receiver current draw will be observable in the transmitter's power amplifier current draw, and this change can be used to detect signals from the receive antennas, as explained below.

Figure 10A:
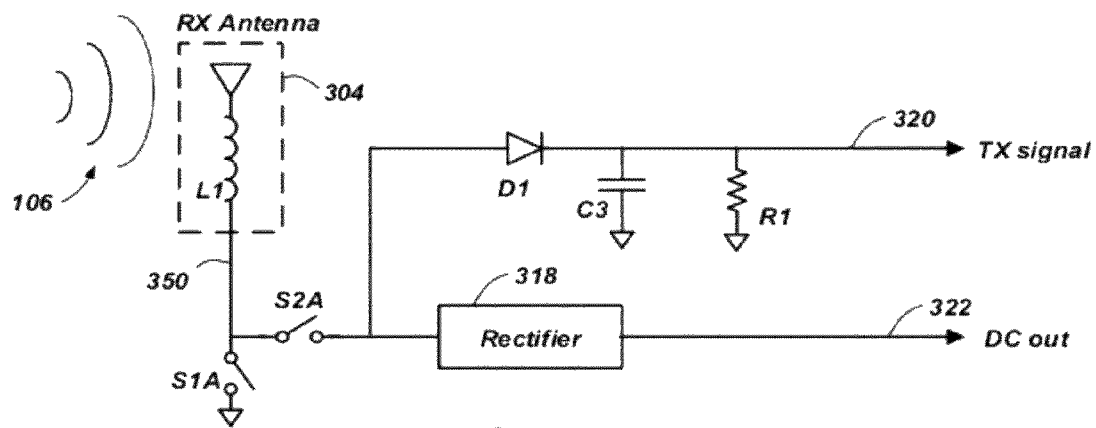
FIGS. 10A-10C shows a simplified schematic of a portion of receive circuitry in various states to illustrate messaging between a receiver and a transmitter.
Figure 10B:
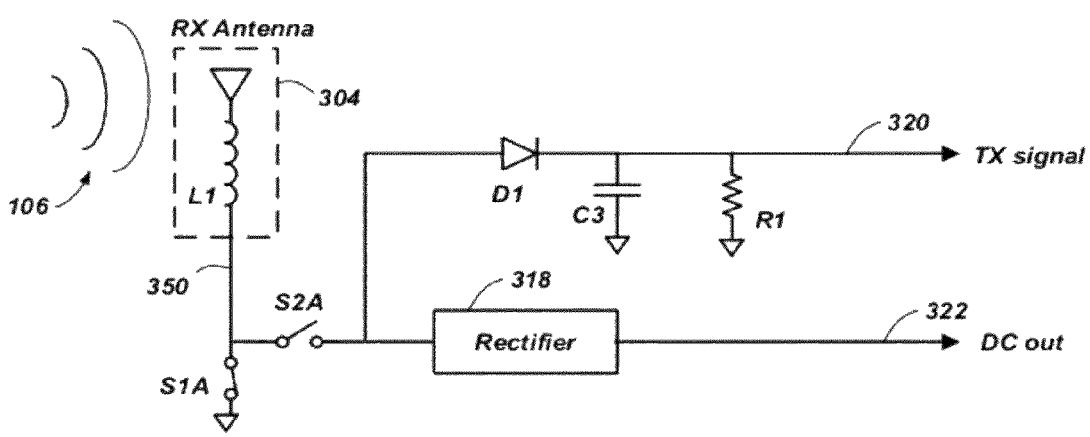
Figure 10C:
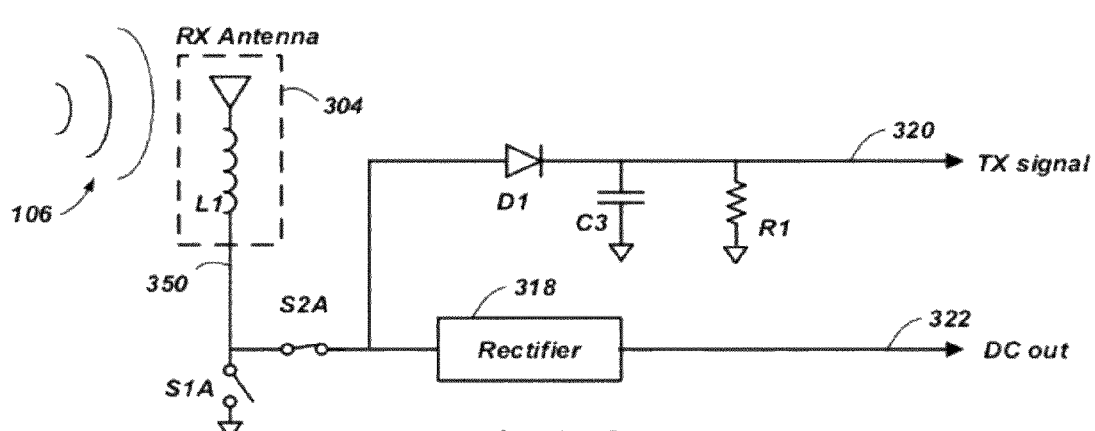

FIGS. 10A-10C show a simplified schematic of a portion of receive circuitry in various states to illustrate messaging between a receiver and a transmitter. All of FIGS. 10A-10C show the same circuit elements with the difference being state of the various switches. A receive antenna 304 includes a characteristic inductance L1, which drives node 350. Node 350 is selectively coupled to ground through switch S1A. Node 350 is also selectively coupled to diode D1 and rectifier 318 through switch S1B. The rectifier 318 supplies a DC power signal 322 to a receive device (not shown) to power the receive device, charge a battery, or a combination thereof. The diode D1 is coupled to a transmit signal 320 which is filtered to remove harmonics and unwanted frequencies with capacitor C3 and resistor R1. Thus the combination of D1, C3, and R1 can generate a signal on the transmit signal 320 that mimics the transmit modulation generated by the transmit modulation signal 224 discussed above with reference to the transmitter in FIG. 9.

Exemplary embodiments of the invention includes modulation of the receive device's current draw and modulation of the receive antenna's impedance to accomplish reverse link signaling. With reference to both FIG. 10A and FIG. 9, as the power draw of the receive device changes, the load sensing circuit 216 detects the resulting power changes on the transmit antenna and from these changes can generate the receive signal 235.

In the exemplary embodiments of FIGS. 10A-10C, the current draw through the transmitter can be changed by modifying the state of switches S1A and S2A. In FIG. 10A, switch S1A and switch S2A are both open creating a "DC open state" and essentially removing the load from the transmit antenna 204. This reduces the current seen by the transmitter.

In FIG. 10B, switch S1A is closed and switch S2A is open creating a "DC short state" for the receive antenna 304. Thus the state in FIG. 10B can be used to increase the current seen in the transmitter.

In FIG. 10C, switch S1A is open and switch S2A is closed creating a normal receive mode (also referred to herein as a "DC operating state") wherein power can be supplied by the DC out signal 322 and a transmit signal 320 can be detected. In the state shown in FIG. 10C the receiver receives a normal amount of power, thus consuming more or less power from the transmit antenna than the DC open state or the DC short state.

Reverse link signaling may be accomplished by switching between the DC operating state (FIG. 10C) and the DC short state (FIG. 10B). Reverse link signaling also may be accomplished by switching between the DC operating state (FIG. 10C) and the DC open state (FIG. 10A).

Figure 11A:
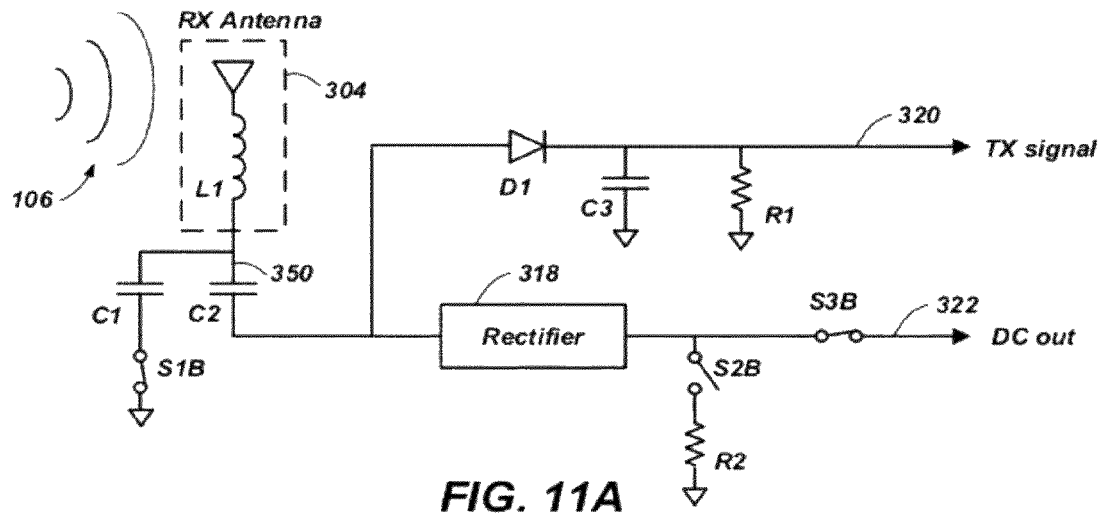
FIGS. 11A-11C shows a simplified schematic of a portion of alternative receive circuitry in various states to illustrate messaging between a receiver and a transmitter.
Figure 11B:
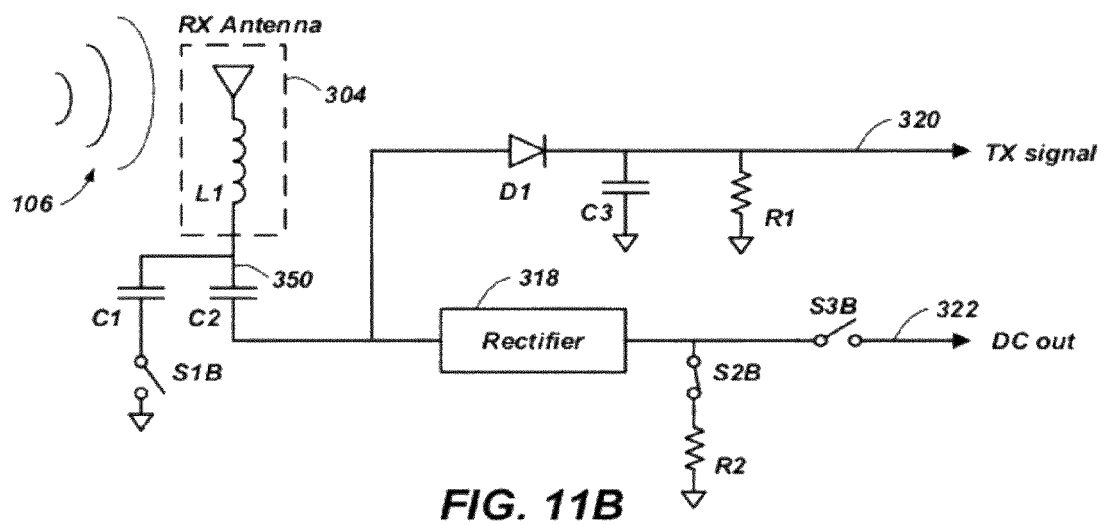
Figure 11C:
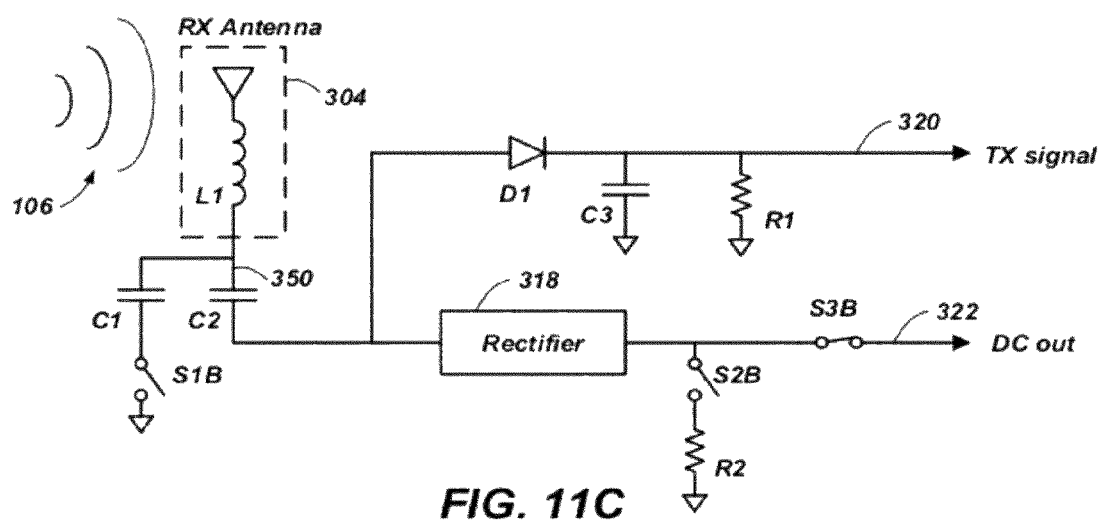

FIGS. 11A-11C shows a simplified schematic of a portion of alternative receive circuitry in various states to illustrate messaging between a receiver and a transmitter.

All of FIGS. 11A-11C show the same circuit elements with the difference being state of the various switches. A receive antenna 304 includes a characteristic inductance L1, which drives node 350. Node 350 is selectively coupled to ground through capacitor C1 and switch SIB. Node 350 is also AC coupled to diode D1 and rectifier 318 through capacitor C2. The diode D1 is coupled to a transmit signal 320 which is filtered to remove harmonics and unwanted frequencies with capacitor C3 and resistor R1. Thus the combination of D1, C3, and R1 can generate a signal on the transmit signal 320 that mimics the transmit modulation generated by the transmit modulation signal 224 discussed above with reference to the transmitter in FIG. 9.

The rectifier 318 is connected to switch S2B, which is connected in series with resistor R2 and ground. The rectifier 318 also is connected to switch S3B. The other side of switch S3B supplies a DC power signal 322 to a receive device (not shown) to power the receive device, charge a battery, or a combination thereof.

In FIGS. 10A-10C the DC impedance of the receive antenna 304 is changed by selectively coupling the receive antenna to ground through switch SIB. In contrast, in the exemplary embodiments of FIGS. 11A-11C, the impedance of the antenna can be modified to generate the reverse link signaling by modifying the state of switches S1B, S2B, and S3B to change the AC impedance of the receive antenna 304. In FIGS. 11A-11C the resonant frequency of the receive antenna 304 may be tuned with capacitor C2. Thus, the AC impedance of the receive antenna 304 may be changed by selectively coupling the receive antenna 304 through capacitor C1 using switch S1B, essentially changing the resonance circuit to a different frequency that will be outside of a range that will optimally couple with the transmit antenna. If the resonance frequency of the receive antenna 304 is near the resonant frequency of the transmit antenna, and the receive antenna 304 is in the near-field of the transmit antenna, a coupling mode may develop wherein the receiver can draw significant power from the radiated field 106.

In FIG. 11A, switch S1B is closed, which de-tunes the antenna and creates an "AC cloaking state," essentially "cloaking" the receive antenna 304 from detection by the transmit antenna 204 because the receive antenna does not resonate at the transmit antenna's frequency. Since the receive antenna will not be in a coupled mode, the state of switches S2B and S3B are not particularly important to the present discussion.

In FIG. 11B, switch S1B is open, switch S2B is closed, and switch S3B is open, creating a "tuned dummy-load state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S3B open and switch S2B closed creates a relatively high current dummy load for the rectifier, which will draw more power through the receive antenna 304, which can be sensed by the transmit antenna. In addition, the transmit signal 320 can be detected since the receive antenna is in a state to receive power from the transmit antenna.

In FIG. 11C, switch S1B is open, switch S2B is open, and switch S3B is closed, creating a "tuned operating state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S2B open and switch S3B closed creates a normal operating state wherein power can be supplied by the DC out signal 322 and a transmit signal 320 can be detected.

Reverse link signaling may be accomplished by switching between the tuned operating state (FIG. 11C) and the AC cloaking state (FIG. 11A). Reverse link signaling also may be accomplished by switching between the tuned dummy-load state (FIG. 11B) and the AC cloaking state (FIG. 11A). Reverse link signaling also may be accomplished by switching between the tuned operating state (FIG. 11C) and the tuned dummy-load state (FIG. 11B) because there will be a difference in the amount of power consumed by the receiver, which can be detected by the load sensing circuit in the transmitter.

Of course, those of ordinary skill in the art will recognize that other combinations of switches S1B, S2B, and S3B may be used to create cloaking, generate reverse link signaling and supplying power to the receive device. In addition, the switches S1A and S1B may be added to the circuits of FIGS. 11A-11C to create other possible combinations for cloaking, reverse link signaling, and supplying power to the receive device.

Thus, when in a coupled mode signals may be sent from the transmitter to the receiver, as discussed above with reference to FIG. 9. In addition, when in a coupled mode signals may be sent from the receiver to the transmitter, as discussed above with reference to FIGS. 10A-10C and 11A-11C.

Figure 12A:
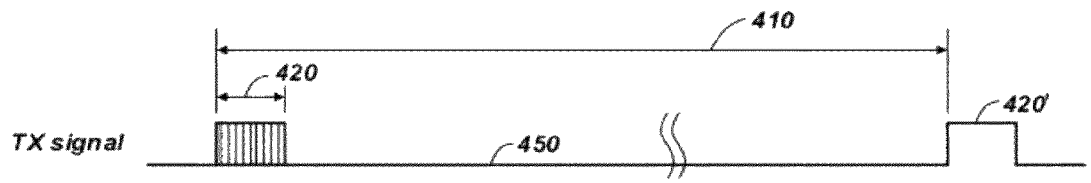
FIGS. 12A-12C are timing diagrams illustrating a messaging protocol for communication between a transmitter and a receiver.
Figure 12B:
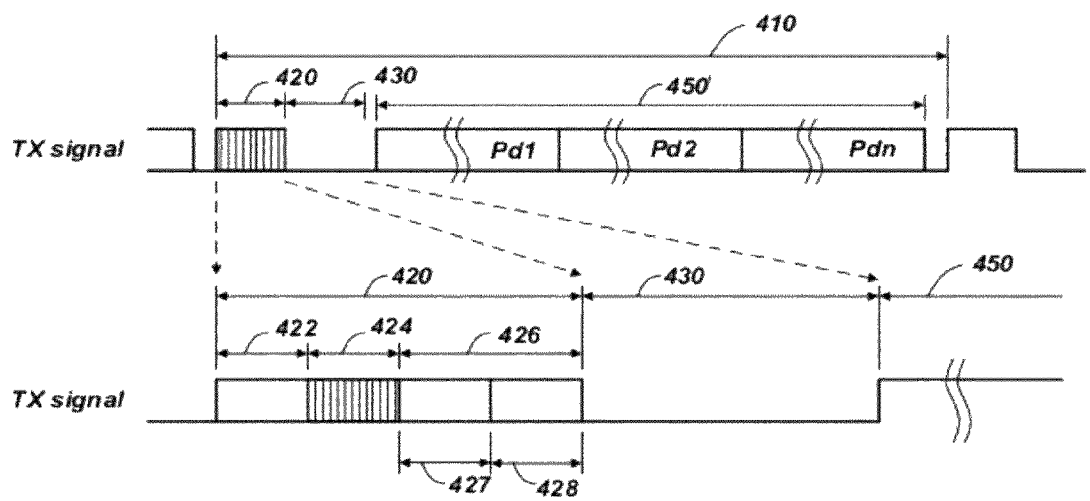
Figure 12C:
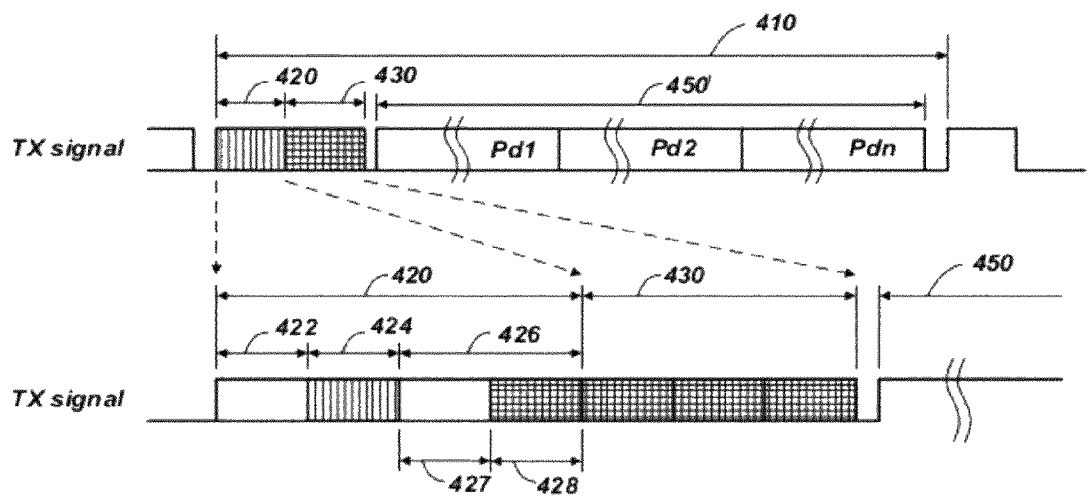

FIGS. 12A-12C are timing diagrams illustrating an exemplary messaging protocol for communication between a transmitter and a receiver using the signaling techniques discussed above. In one exemplary approach, signals from the transmitter to the receiver are referred to herein as a "forward link" and use a simple AM modulation between normal oscillation and no oscillation. Other modulation techniques are also contemplated. As a non-limiting example, a signal present may be interpreted as a 1 and no signal present may be interpreted as a 0.

Reverse link signaling is provided by modulation of power drawn by the receive device, which can be detected by the load sensing circuit in the transmitter. As a non-limiting example, higher power states may be interpreted as a 1 and lower power states may be interpreted as a 0. It should be noted that the transmitter must be on for the receiver to be able to perform the reverse link signaling. In addition, the receiver should not perform reverse link signaling during forward link signaling. Furthermore, if two receive devices attempt to perform reverse link signaling at the same time a collision may occur, which will make it difficult, if not impossible for the transmitter to decode a proper reverse link signal.

In the exemplary embodiment described herein, signaling is similar to a Universal Asynchronous Receive Transmit (UART) serial communication protocol with a start bit, a data byte, a parity bit and a stop bit. Of course, any serial communication protocol may be suitable for carrying the exemplary embodiment of the present invention described herein. For simplicity of description, and not as a limitation, the messaging protocol will be described such that the period for communicating each byte transmission is about 10 mS.

FIG. 12A illustrates a simple and low power form of the messaging protocol. A synchronization pulse 420 will be repeated every recurring period 410 (about one second in the exemplary embodiment). As a non-limiting example, the sync pulse on time may be about 40 mS. The recurring period 410 with at least a synchronization pulse 420 may be repeated indefinitely while the transmitter is on. Note that "synchronization pulse" is somewhat of a misnomer because the synchronization pulse 350 may be a steady frequency during the pulse period as illustrated by the "white" pulse 420'. The synchronization pulse 420 may also include signaling at the resonant frequency with the ON/OFF keying discussed above and as illustrated by the "hatched" pulse 420. FIG. 12A illustrates a minimal power state wherein power at the resonant frequency is supplied during the synchronization pulse 420 and the transmit antenna is off during a power period 450. All receive devices are allowed to receive power during the synchronization pulse 420.

FIG. 12B illustrates the recurring period 410 with a synchronization pulse 420, a reverse link period 430 and a power period 450' wherein the transmit antenna is on and supplying full power by oscillating at the resonant frequency and not performing any signaling. The upper timing diagram illustrates the entire recurring period 410 and the lower timing diagram illustrates an exploded view of the synchronization pulse 420 and the reverse link period 430. The power period 450' may be segmented into different periods for multiple receive devices as is explained below. FIG. 12B shows three power segments Pd1, Pd2, and Pdn for three different receive devices.

When forward link signaling occurs, the synchronization pulse 420 may include a warm-up period 422, a forward link period 424, and a listening period 426. The listening period 426 may include a handover period 427 and a beginning reverse link period 428. During the synchronization pulse 420, the transmitter may send out a forward link message during the forward link period 400 (indicated by the "hatched" section) and waits for a reply from a receiver during the listening period 426. In FIG. 12B, no receivers reply, which is indicated by the "white" sections during the listening period 426.

FIG. 12C is similar to FIG. 12B except that a receiver replies during the beginning reverse link period 428 and the reverse link period 430, as indicated by the "cross-hatched" sections. In FIG. 12, during the synchronization pulse 420, the transmitter sends out a forward link message during the forward link period 400 and waits for a reply from a receiver during the listening period 426. Any receivers that are going to reply begin their reply before the end of the handover period 427, during the beginning reverse link period 428, and possibly during the reverse link period 430.

As a non-limiting example, Table 2 shows some possible messages that may be sent by the transmitter and the receiver.

TABLE 2

| TX Command | TX message | RX Reply | RX message |
|---|---|---|---|
| Null | | | |
| NDQ (New Device Query) | | NDR (New Device Response) | DD TT PP rr cc |
| DQ (Device Query) | DD | DS (Device Status) | DD TT PP cc |
| ACK (Acknowledge a device XX from previous DS) | | | |
| SA (Slot Assignment) | DD NN MM cc | | |
| RES (Reset all power slot assignments) | | | |

Where:
Null = no transmit command;
DD = Device number;
TT = Device Type;
PP = Power requested;
rr = a random number;
cc = a checksum;
NN = start of time slot; and
MM = end of time slot.

In explaining table 1, the null command means that no messaging is sent by the transmitter during the forward link period 424. In line 2, a new device query (NDQ) is sent by the transmitter. If a receive device responds, it responds with a new device response (NDR) along with a device number (which should be zero for a new device, until the device number is assigned by the transmitter), a power request, a random number, and a checksum of all the data bits in the receive reply.

In line 3, a new device query (DQ) is sent by the transmitter along with a device number. The receive device that was addressed by the DQ replies with a device status (DS), along with the device number, the device type, the amount of power requested, and a checksum of all the data bits in the receive reply.

In line 4, the transmitter sends out an acknowledge (ACK) to the receiver that replied to the previous DQ. No receivers respond to an ACK In line 5, the transmitter sends out a slot assignment (SA) along with a device number, a start time within the power period 450', an end time within the power period 450', and a checksum of all the data bits in the receive reply. No receivers respond to an SA.

In line 6, the transmitter sends out a reset (RES) indicating that all receivers should stop using their allocated time slots. No receivers respond to an RES.

Of course, those of ordinary skill in the art will recognize that the commands and responses are exemplary and various embodiments contemplated within the scope of the present invention may use variations of these commands and responses, and additional commands and responses may be devised within the scope of the present invention.

To further illustrate how communication occurs, five different scenarios will be discussed. In the first scenario, initially no receive devices are within the coupling-mode region of the transmitter and one receive device enters the coupling-mode region. When no device are present in the coupling-mode region the transmitter will remain in the low power state as illustrated in FIG. 12A and repeat the synchronization pulse 420 every recurring period 410. The synchronization pulse 420 will include a NDQ during the forward link period 424 and the transmitter will listen for a reply during the listening period 426. If no reply is received, the transmitter shuts down until time for the synchronization pulse 420 of the next recurring period 410.

When a new receive device is introduced to the coupling-mode region, the receive device is initially on and listening for a synchronization pulse 420. The new receive device may use the synchronization pulse 420 for power but should go into a cloaked or non-power reception mode (referred to herein as "getting off the bus") during the power period 450'. In addition, the new receive device listens for transmit commands and ignores all transmit commands except an NDQ. When a new receive device receive an NDQ, it remains on during the handover period 427, the beginning reverse link period 428, and possibly the reverse link period 430. After the forward link period 424 and before the end of the handover period 427, the receive device responds with a NDR, a device ID of zero (a new device ID will be assigned by the transmitter), a power amount request, a random number and a checksum. The new receive device then gets off the bus during the power period 450'.

If the transmitter receives the NDR correctly, it responds on the next synchronization pulse 420 with a slot assignment (SA) for the new receive device. The SA includes a device ID for the new receive device, a start time, an end time, and a checksum. The start time and end time for this SA will be zero indicating that the new receive device should not get on the bus for any time period during the power period 450'. The new receive device will receive a subsequent SA with actual start times and end times assigning a specific power segment Pdn when it can get on the bus. If the new receive device does not receive a proper checksum, in remains in new device mode and responds again to an NDQ.

In the second scenario, no receive devices are within the coupling-mode region of the transmitter and more than one receive device enters the coupling-mode region. In this mode, when two new receive devices are introduced to the coupling-mode region they are initially on the bus all the time. The new receive devices may use the synchronization pulse 420 for power but should get off the bus during the power period 450' once a synchronization pulse 420 has been received. In addition, the new receive devices listen for transmit commands and ignore all transmit commands except an NDQ. When the new receive device receive an NDQ, they remain on during the handover period 427, the beginning reverse link period 428, and possibly the reverse link period 430. After the forward link period 424 and before the end of the handover period 427, the receive devices responds with a NDR, a device ID of zero (a new device ID will be assigned by the transmitter), a power amount request, a random number and a checksum.

However, since two or more receive devices are responding at the same time, and likely have different random numbers and checksums, the message received by the transmitter will be garbled, and the checksum in the transmitter will not be accurate. As a result, the transmitter will not send out a SA on the subsequent synchronization pulse 420.

When an immediate SA is not forthcoming after an NDR, each of the receive devices waits a random number of subsequent NDQs before responding with an NDR. For example, two devices both respond to the first NDQ so no subsequent SA happens. Device 1 decides to wait four NDQs before responding to another NDQ. Device 2 decides to wait two NDQs before responding to another NDQ. As a result, on the next NDQ sent out by the transmitter, neither device responds with an NDR. On the next NDQ sent out by the transmitter, only device 2 responds with an NDR, the transmitter successfully receives the NDR and sends out an SA for device 2. On the next NDQ, device 2 does not respond because it is no longer a new device and device 1 does not respond because its random waiting period has not elapsed. On the next NDQ sent out by the transmitter, only device 1 responds with an NDR, the transmitter successfully receives the NDR and sends out an SA for device 1.

In the third scenario, at least one receive device is in the coupling-mode region and a new receive device enters the coupling-mode region. In this mode, the new receive devices is introduced to the coupling-mode region and is initially on the bus all the time. The new receive devices may use the synchronization pulse 420 for power but should get off the bus during the power period 450' once a synchronization pulse 420 has been received. In addition, the new receive devices listen for transmit commands and ignore all transmit commands except an NDQ. Periodically, the transmitter will issue an NDQ to see if any new devices have entered the coupling-mode region. The new device will then reply with an NDR. On the subsequent synchronization pulse 420, the transmitter will issue an SA for the new device with no power slots assigned. The transmitter then recalculates power allocation for all the devices in the coupling-mode region and generates new SAs for each device so there are no overlapping power segments Pdn. After each device receives its new SA, it begins getting on the bus only during its new Pdn.

In the fourth scenario, normal power delivery operation continues with no receive device entering or leaving the coupling-mode region. During this scenario, the transmitter will periodically ping each device with a device query (DQ). The queried device responds with a device status (DS). If the DS indicates a different power request, the transmitter may reallocate power allocation to each of the devices in the coupling-mode region. The transmitter will also periodically issues an NDQ as was explained above for the third scenario.

In the fifth scenario, a device is removed from the coupling-mode region. This "removed" state may be that the device is physically removed from the coupling-mode region, the device is shut off, or the device cloaks itself, perhaps because it does not need any more power. As stated earlier, the transmitter periodically sends out a DQ for all the devices in the coupling-mode region. If two consecutive DQs to a specific device do not return a valid DS, the transmitter removes the device from its list of allocated devices and reallocates the power period 450' to the remaining devices. The transmitter will also assign the missing device a power allocation of zero time in case it is still receiving by is unable to transmit. If a device was erroneously removed from the power allocation, it may regain power allocation by responding to and NDQ with a proper NDR.

Table 3 illustrates a non-limiting sequence of commands and replies to illustrate how the communication protocol operates.

TABLE 3

| Command | Description | Reply | Description | Comments |
|---|---|---|---|---|
| DQ1 | Query Device 1 | DS 1 1 FF cc | Device 1 is type 1, wants max power | Cellphone with low battery |
| DQ2 | Query Device 2 | DS 2 1 84 cc | Device 2 is type 3, wants to reduce power time slot | PDA with almost charged battery |
| SA 2 84 FF | Slot assign device 2 | | | Reduce device 2's power slot (reduce first, then increase) |
| SA 1 00 83 | Slot assign device 1 | | | Increase device 1's power slot |
| NDQ | New device query | NDR 00 04 FF rr cc | New device found | Mouse with a low battery, max power |
| SA 3 00 00 | Slot assign device 3 | | | Immediate reply after NDQ means it is for new device. Device ID is 3. Initial power slot is 0. |
| SA 1 00 40 | Slot assign device 1 | | | Device 1 reassigned to ¼ power. |
| SA 2 41 80 | Slot assign device 2 | | | Device 2 reassigned to ¼ power. |
| SA 3 81 FF | Slot assign device 2 | | | Device 3 reassigned to ½ power. |
| NDQ | New device query | | | No reply so no new device found. |
| null | | | | |
| DQ1 | | | | |
| DQ2 | | | | |
| DQ3 | | | | |
| NDQ | | | | |

Note that the first slot assignment for the new device allocates no time slot. Each existing device is allocated a new non-overlapping time slot, then the new device is finally allocated a time slot for receiving power.

In an exemplary embodiment, a wireless charging devices may display a visible signal, such as, for example, a light to the user indicating that it has successfully entered the charging region and registered itself to the local transmitter. This will give the user positive feedback that a device is indeed prepared to charge.

In other exemplary embodiments of the present invention, the receiver and transmitter may communicate on a separate communication channel 119 (e.g., Bluetooth, zigbee, cellular, etc) as is shown in FIG. 2. With a separate communication channel, the recurring period need not include any communication periods and the entire time may be devoted to the power period 450'. The transmitter may still allocate time slots to each receive device (communicated over the separate communication channel) and each receive device only gets on the bus for its allocated power segment Pdn.

The time-multiplexed power allocations described above may be the most-efficient method for supplying power to multiple receive devices within a transmitter's coupling-mode region. However, other power allocation scenarios may be employed with other embodiments of the present invention.

Figure 13A:
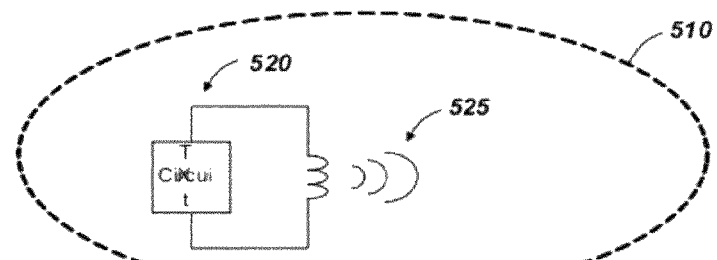
FIGS. 13A-13D are simplified block diagrams illustrating a beacon power mode for transmitting power between a transmitter and a receiver.

FIGS. 13A-13D are simplified block diagrams illustrating a beacon power mode for transmitting power between a transmitter and a one or more receivers. FIG. 13A illustrates a transmitter 520 having a low power "beacon" signal 525 when there are no receive devices in the beacon coupling-mode region 510. The beacon signal 525 may be, as a non-limiting example, such as in the range of ~10 to ~20 mW RF. This signal may be adequate to provide initial power to a device to be charged when it is placed in the coupling-mode region.

Figure 13B:
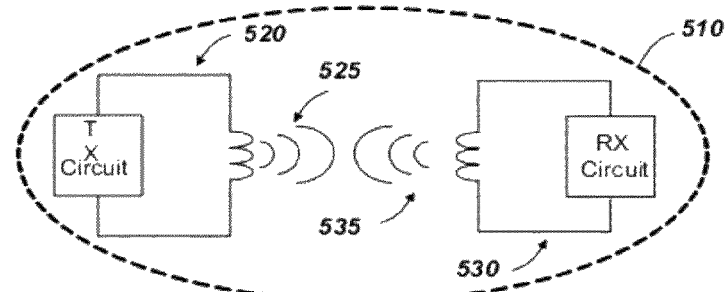

FIG. 13B illustrates a receive device 530 placed within the beacon coupling-mode region 510 of the transmitter 520 transmitting the beacon signal 525. If the receive device 530 is on and develops a coupling with the transmitter it will generate a reverse link coupling 535, which is really just the receiver accepting power from the beacon signal 525. This additional power, may be sensed by the load sensing circuit 216 (FIG. 9) of the transmitter. As a result, the transmitter may go into a high power mode.

Figure 13C:
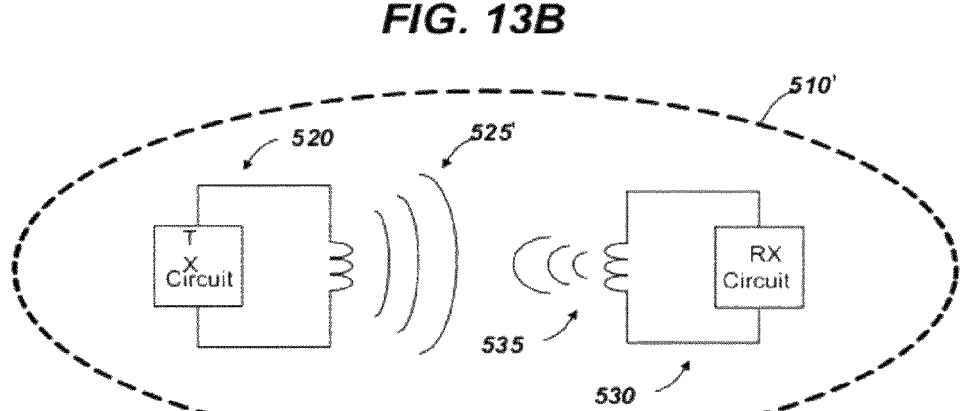

FIG. 13C illustrates the transmitter 520 generating a high power signal 525' resulting in a high power coupling-mode region 510'. As long as the receive device 530 is accepting power and, as a result, generating the reverse link coupling 535, the transmitter will remain in the high power state. While only one receive device 530 is illustrated, multiple receive devices 530 may be present in the coupling-mode region 510. If there are multiple receive device 530 they will share the amount of power transmitted by the transmitter based on how well each receive device 530 is coupled. For example, the coupling efficiency may be different for each receive device 530 depending on where the device is placed within the coupling-mode region 510 as was explained above with reference to FIGS. 8 and 9.

Figure 13D:
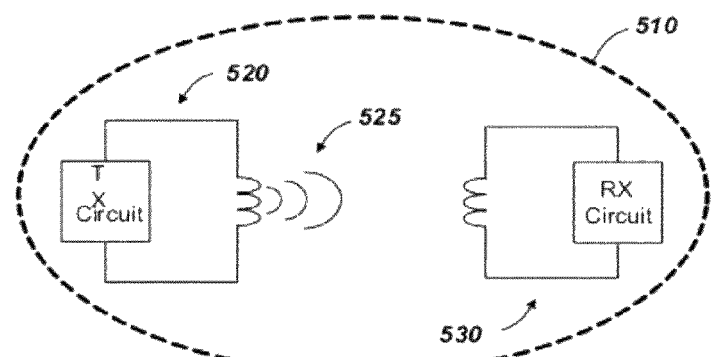

FIG. 13D illustrates the transmitter 520 generating the beacon signal 525 even when a receive device 530 is in the beacon coupling-mode region 510. This state may occur when the receive device 530 is shut off, or the device cloaks itself, perhaps because it does not need any more power.

As with the time-multiplexing mode, the receiver and transmitter may communicate on a separate communication channel (e.g., Bluetooth, zigbee, etc). With a separate communication channel, the transmitter may determine when to switch between beacon mode and high power mode, or create multiple power levels, based on the number of receive devices in the coupling-mode region 510 and their respective power requirements.

Exemplary embodiments of the invention include enhancing the coupling between a relatively large transmit antenna and a small receive antenna in the near-field power transfer between two antennas through introduction of additional antennas into the system of coupled antennas that will act as repeaters and will enhance the flow of power from the transmitting antenna toward the receiving antenna.

In exemplary embodiments, one or more extra antennas are used that couple to the transmit antenna and receive antenna in the system. These extra antennas comprise repeater antennas, such as active or passive antennas. A passive antenna may include simply the antenna loop and a capacitive element for tuning a resonant frequency of the antenna. An active element may include, in addition to the antenna loop and one or more tuning capacitors, an amplifier for increasing the strength of a repeated near-field radiation.

The combination of the transmit antenna and the repeater antennas in the power transfer system may be optimized such that coupling of power to very small receive antennas is enhanced based on factors such as termination loads, tuning components, resonant frequencies, and placement of the repeater antennas relative to the transmit antenna.

A single transmit antenna exhibits a finite near-field coupling mode region.

Accordingly, a user of a device charging through a receiver in the transmit antenna's near-field coupling mode region may require a considerable user access space that would be prohibitive or at least inconvenient. Furthermore, the coupling mode region may diminish quickly as a receive antenna moves away from the transmit antenna.

A repeater antenna may refocus and reshape a coupling mode region from a transmit antenna to create a second coupling mode region around the repeater antenna, which may be better suited for coupling energy to a receive antenna. Discussed below in FIGS. 14A and 14B are some non-limiting examples of embodiments including repeater antennas.

Figure 14A:
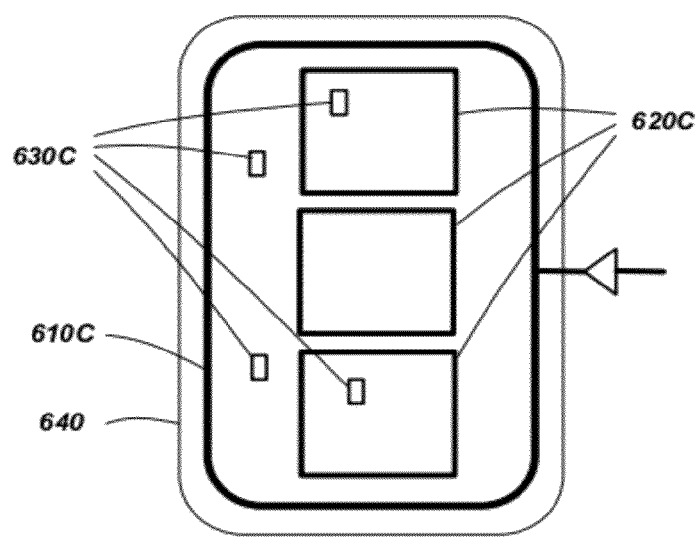
FIG. 14A illustrates a large transmit antenna with a three different smaller repeater antennas disposed coplanar with, and within a perimeter of, the transmit antenna.

FIG. 14A illustrates a large transmit antenna 610C with three smaller repeater antennas 620C disposed coplanar with, and within a perimeter of, the transmit antenna 610C. The transmit antenna 610C and repeater antennas 620C are formed on a table 640. Various devices including receive antennas 630C are placed at various locations within the transmit antenna 610C and repeater antennas 620C. The exemplary embodiment of FIG. 14A may be able to refocus the coupling mode region generated by the transmit antenna 610C into smaller and stronger repeated coupling mode regions around each of the repeater antennas 620C. As a result, a relatively strong repeated near-field radiation is available for the receive antennas 630C. Some of the receive antennas are placed outside of any repeater antennas 620C. Recall that the coupled mode region may extend somewhat outside the perimeter of an antenna. Therefore, receive antennas 630C may be able to receive power from the near-field radiation of the transmit antenna 610C as well as any nearby repeater antennas 620C. As a result, receive antennas placed outside of any repeater antennas 620C, may be still be able to receive power from the near-field radiation of the transmit antenna 610C as well as any nearby repeater antennas 620C.

Figure 14B:
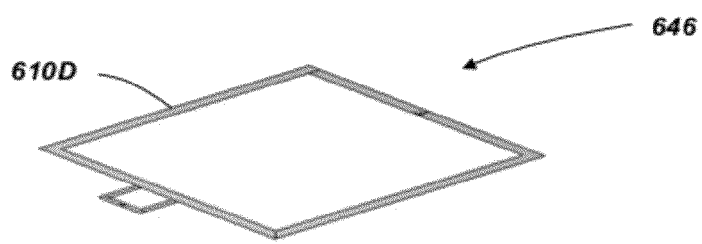
FIG. 14B illustrates a large transmit antenna with smaller repeater antennas with offset coaxial placements and offset coplanar placements relative to the transmit antenna.
Figure 14B:
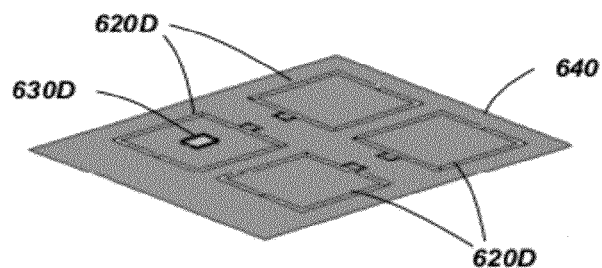

FIG. 14B illustrates a large transmit antenna 610D with smaller repeater antennas 620D with offset coaxial placements and offset coplanar placements relative to the transmit antenna 610D. A device including a receive antenna 630D is placed within the perimeter of one of the repeater antennas 620D. As a non-limiting example, the transmit antenna 610D may be disposed on a ceiling 646, while the repeater antennas 620D may be disposed on a table 640. The repeater antennas 620D in an offset coaxial placement may be able to reshape and enhance the near-field radiation from the transmitter antenna 610D to repeated near-field radiation around the repeater antennas 620D. As a result, a relatively strong repeated near-field radiation is available for the receive antenna 630D placed coplanar with the repeater antennas 620D.

While the various transmit antennas and repeater antennas have been shown in general on surfaces, these antennas may also be disposed under surfaces (e.g., under a table, under a floor, behind a wall, or behind a ceiling), or within surfaces (e.g., a table top, a wall, a floor, or a ceiling).

Figure 15:
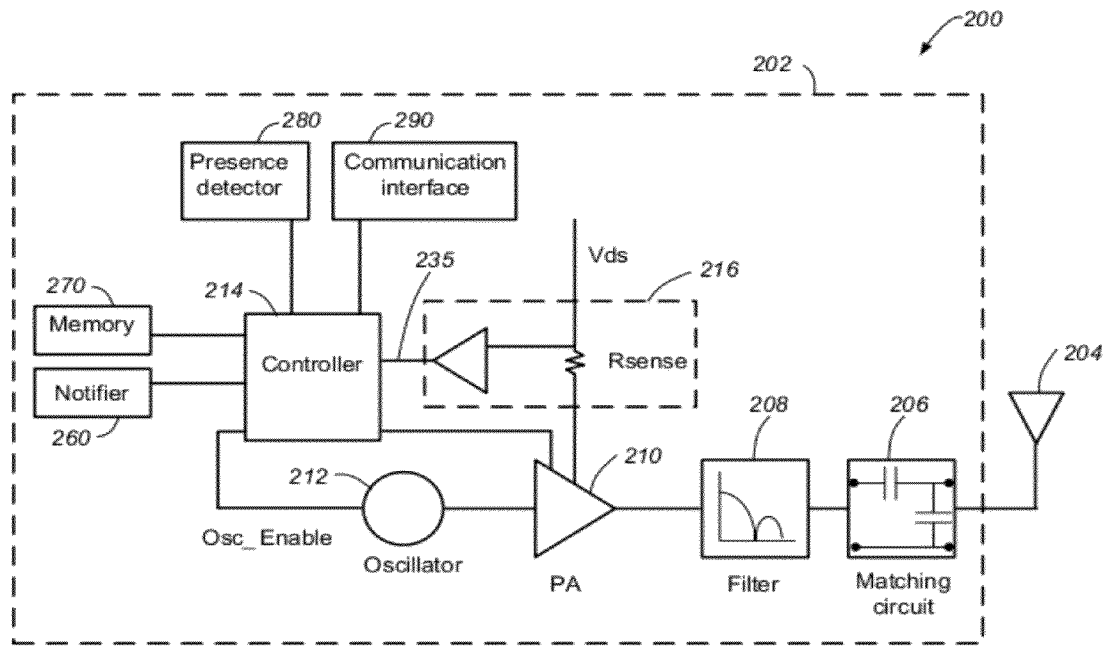
FIG. 15 is a simplified block diagram of a transmitter including a notification element.

FIG. 15 is a simplified block diagram of a transmitter 200 for transmitting power to, communicating with, and tracking receiver devices according to one or more embodiments of the present invention. A transmitter 200 may gather and track information about the whereabouts and status of receiver devices that may be associated with the transmitter 200. The transmitter 200 of FIG. 15 is similar to that of FIG. 7 and, therefore, does not need to be explained again. However, in FIG. 15 the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

The transmit circuitry 202 may also include a user-perceivable notifier 260 for indicating to a user notification information about receiver devices that are in the coupling-mode region of the transmit antenna 204. In addition, the transmit circuitry 202 may include a memory 270 for storing information about the receiver devices that it communicates with as well as other data and processing instructions.

Figure 16:
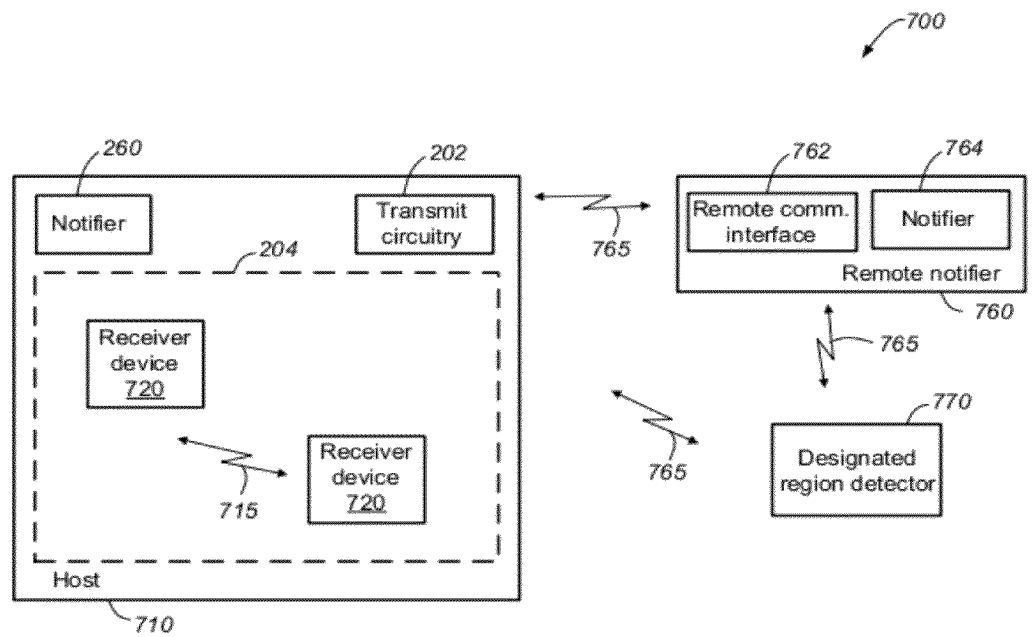
FIG. 16 is a simplified block diagram of wireless power transfer system including notification elements.

FIG. 16 is a simplified block diagram of wireless power transmitting system 700 including notification elements 260 and 760. The system 700 includes a host device 710 with a transmitter including transmit circuitry 202 and a transmit antenna 204. The host device 710 may also include a user-perceivable notifier 260. Multiple receiver devices 720 with receive antennas may be placed in a coupling-mode region of the transmit antenna 204. When in the coupling-mode region, the receiver devices 720 may receive power from the host device 710 and may communicate with the host device 710 as discussed above with respect to FIGS. 10A-13D.

Exemplary embodiments of the present invention allow power transfer to several devices at the same time. In addition, while the receiver devices 720 are in the charging area (i.e., in or near the coupling-mode region) they can exchange certain pre-specified information with the host device 710 or other receiver device 720.

Receiver information may include items such as; unique device identifiers, device types, contact information, and user-programmed information about the device. For example, the device may be a music player, from a specific manufacturer, that is tagged with a user's name. As another example, the device may be an electronic book, from a specific manufacturer, with a specific serial number that is tagged with a user's name.

The owners of each device may need to pre-configure their devices to allow such information sharing capability, but once enabled, the devices could communicate without direct human interaction.

In many situations it is common user behavior to charge certain groups of objects simultaneously. For example, people often charge both a cell-phone and an accompanying Bluetooth headset at the same time. In addition, parents may wish to ensure that children have their cell-phone, net-book, E-reader, and the like charged each night so that they are ready for school the next day. Parents may teach children to charge all their devices at the same time on a certain host device 710. If the children are not charging their devices together, it could mean a device has been lost, or simply that the child has forgotten to charge all devices at the end of that specific day. In either case, it would be useful for the parent(s) to get a notification if a device is missing or is not being charged.

The receiver devices 720 and host device 710 may communicate on a separate communication channel 715 (e.g., Bluetooth, zigbee, near field communication, etc). With a separate communication channel, the transmitter may determine when to switch between using the wireless power communication and the separate communication channel 715.

As a non-limiting example, for small amounts of information to be transferred between the host device 710 and receiver devices 720, the devices could possibly use near field communication (NFC) or the reflected impedance based on-off keying discussed above.

If the amount of data to be transferred would take longer than, for example only, 10 second with either NFC or reflected impedance techniques, then a be-directional personal area network (PAN) link may be created. Thus, PAN technologies such as Bluetooth, or 60 GHz could be used to communicate between the host device 710 and the receiver device 720. This peer-to-peer connection could be negotiated on a lowest common denominator basis where the lowest common denominator would be the PAN technology that was supported by all the receiver devices 720 in the coupling-mode region. In other words, selection of the appropriate technology could be based first on the amount of data to be transferred and second on the kind of radio technologies supported by the various devices.

The wireless power transmitting system 700 may include a remote notifier 760. Both the notifier 260 on the host device 710 and the remote notifier 760 may have a wide range of notification elements. As non-limiting examples, the notifier (260 and 760) may be a simple light indicating that a receiver device 720 is present, multiple lights indicating how many receiver devices 720 are present, an alpha-numeric display for presenting information about the receiver devices 720, or a full-color display for presenting detailed information about receiver devices 720. The notifier (260 and 760) may include an auditory signaler for notifying a user regarding the presence or absence of a specific receiver device 720 and other information about receiver devices 720. In addition, the remote notifier 760 may be a web-site for displaying information about the receiver devices 720 on a remote computer. Thus, as a non-limiting example, a user that forgot her cell phone may check the web-site from work to determine whether she left the cell phone near the host device 710.

The power transmitting system 700 may include a designated region detector 770. This designated region detector 770 may be as simple as a switch on an exit door from a home or office. However, it may be more complicated, such as a presence detector as discussed above. Thus, the designated region detector 770 may be used to detect when a host device 710 is leaving a designated region and communicate a notification indicating such to the host device 710.

The remote notifier 760, designated region detector 770, and host device 710 may communicate on a communication channel 765 such as radio frequency signaling, infrared signaling, Bluetooth, zigbee, the 802.11 communication protocols, and combinations thereof.

Figure 17:
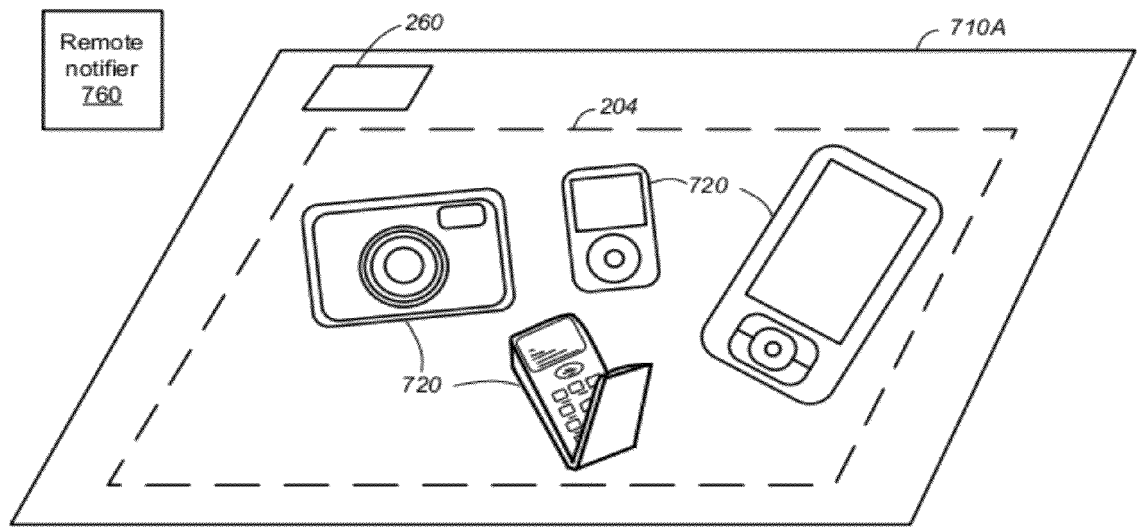
FIG. 17 illustrates a host device with a notifier and including receiver devices.

FIG. 17 illustrates a host device 710A with a notifier 760 and including receiver devices 720 within the coupling-mode region of a transmit antenna 204. A remote notifier 760 may also be in communication with the host device 710A. In FIG. 17, the host device 710 is illustrated as a charging mat, but could be integrated into furniture or building elements such as walls, ceilings, and floors.

Figure 18:
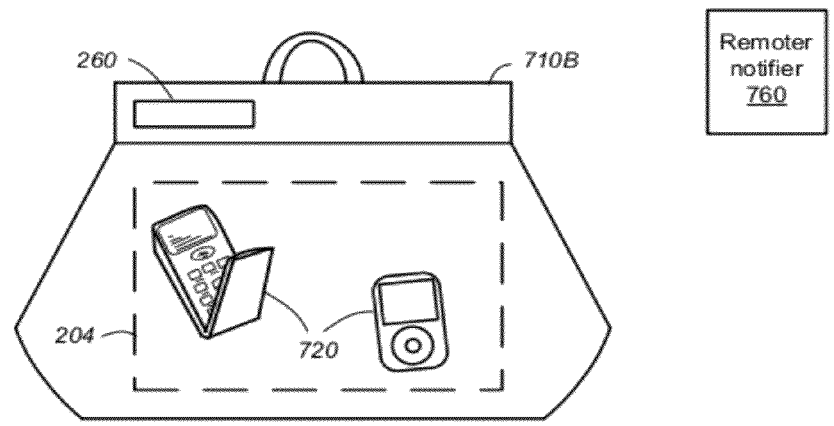
FIG. 18 illustrates another host device with a notifier and including receiver devices.

FIG. 18 illustrates another host device 710B with a notifier 260 and including receiver devices 720 within the coupling-mode region of a transmit antenna 204. A remote notifier 760 may also be in communication with the host device 710B. The host device 710B of FIG. 18 may be an item such as, for example, a handbag, backpack, or briefcase with a transmitter built in. Alternatively, the host device may be a portable transmitter specifically designed for a user to transport receiver devices 720, such as a charging bag.

Figure 19:
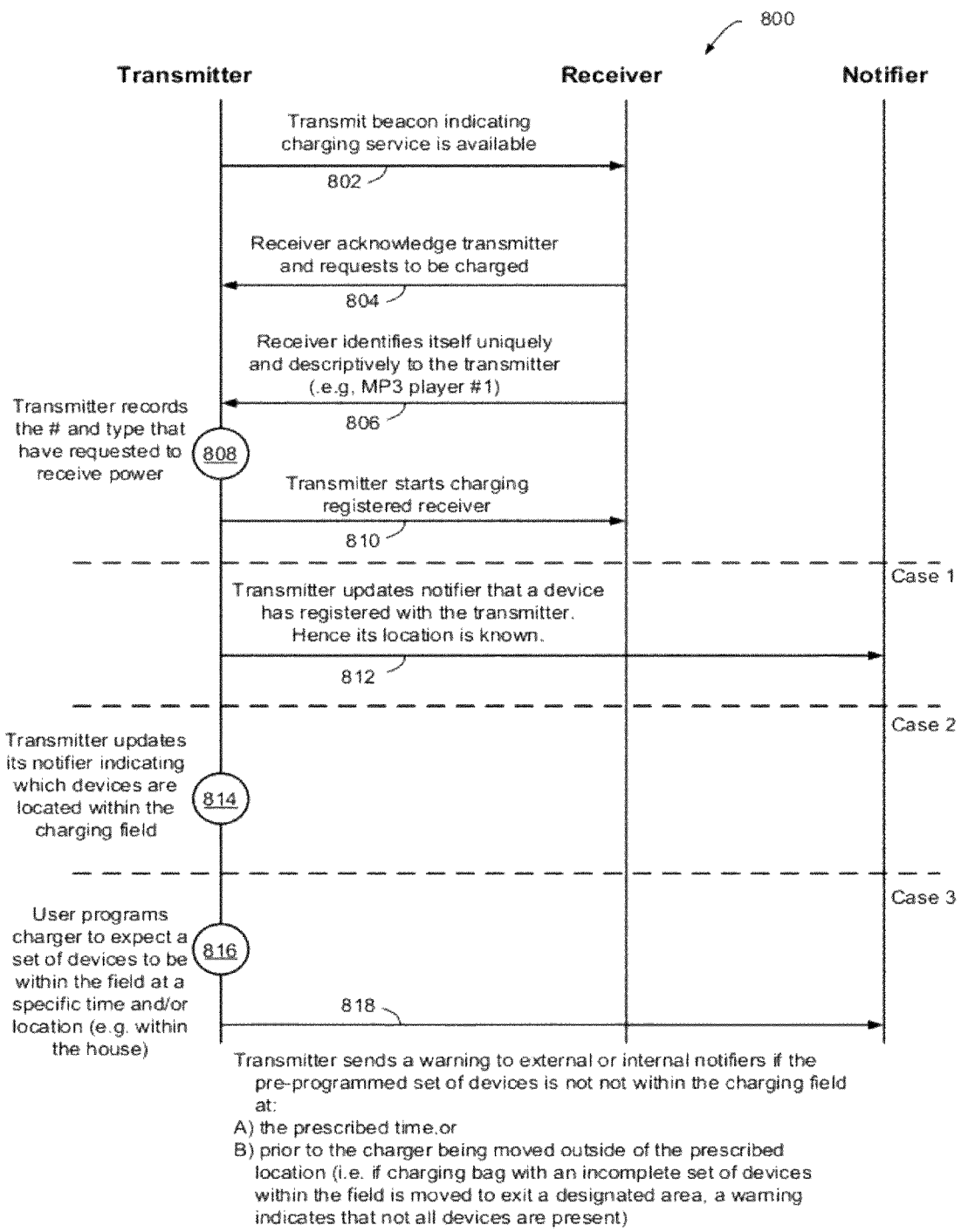
FIG. 19 is a simplified flow diagram illustrating acts that may be performed in tracking receiver devices.

FIG. 19 is a simplified flow diagram illustrating acts that may be performed in communicating with and tracking receiver devices. It is noted that the exemplary embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process is terminated when its acts are completed. A process may correspond to a method, a function, a procedure, a subroutine, a subprogram, etc. Furthermore, the methods disclosed herein may be implemented in hardware, software, or a combination thereof.

In discussing the process 800 of FIG. 19, reference is also made to FIGS. 15 and 16 regarding specific elements that may perform some of the functions described.

To keep track of receiver devices 720 within the coupling-mode region of the host device 710, exemplary embodiments may take advantage of the fact that the wireless charging protocol discussed above already allows for a receiver device to request power. Additional acts, additional information, or a combination thereof as part of the charging protocol or other communication channel 715 would allow the host device 710 to keep track of various receiver devices 720 within its coupling-mode region.

Thus, the on-off keying communication protocol discussed above may be expanded to enable the receiver device 720 requesting charge to identify itself with a unique identifier, such as, for example a serial number or a tag associating the receiver device with a specific user. The requesting receiver device 720 may also communicate additional information such as class of device (e.g., camera, cell phone, media player, personal digital assistant).

In operation 802 a transmitter (i.e., a power transmitting device 200 on a host device 710) transmits its beacon or other generic communication indicating that it is available to transmit power to receiver devices 720.

In operation 804, one or more receivers acknowledge the transmitter and request to receive power, which may be used to charge the device, operate the device, or a combination thereof.

In operation 806, the receiver identifies itself to the transmitter with a unique identifier, such as a tag associated with the device, a serial number, or other unique data. The receiver may also include additional information such as the type of device, information about the device's capabilities, and information about the device's owner.

In operation 808, the transmitter records the unique identifier and other suitable information about the receivers that have communicated such information. The transmitter may also associate the information with other information on the transmitter. For example, the transmitter may be programmed to correlate a specific device with a specific user such that more detailed information can be presented on the notifiers 260 and 760. In other words, the transmitter may be programmed to associate a specific serial number with the user "John" such that the notifier may be able to indicate information such as, "John's PDA is present in host device 1" or John's PDA is expected to be at host device 2, but is not present."

In operation 810, the transmitter begins, or resumes, transmitting power to the receivers within its coupling-mode region.

Additional features may be included in some exemplary embodiments of the invention. As non-limiting examples, three cases of possible additional features are outlined below and illustrated in FIG. 19.

In case 1 illustrated by operation 812, the transmitter may update the remote notifier 760 that a receiver device 720 has registered with the transmitter. Thus, the location of that receiver device 720, as well as other information about that receiver device 720, is known and may be presented on the remote notifier 760.

In case 2 illustrated by operation 814, the transmitter may update its own notifier 260 that a receiver device 720 has registered with the transmitter. Thus, the location of that receiver device 720, as well as other information about that receiver device 720, is known and may be presented on the notifier 260.

Case 3 is illustrated by operation 816 and 818. In operation 816, the transmitter may be programmed to expect certain receiver devices 720 to be in its coupling-mode region during certain time periods. In addition, portable host devices 710B may be programmed to expect receiver devices 720 to be at certain locations during certain times. For example, a portable host device 710B may be programmed to indicate that a PDA should be in the office during working hours and at home during non-working hours. Thus, a user may pre-set a handbag (e.g., host device 710B) capable of charging portable devices, to expect a certain set of receiver devices 720 to be placed within the handbag prior to the bag leaving the house.

As non-limiting examples, this time and position information that may be programmed into host devices may be used to allow a host device to warn if certain receiver devices aren't on a charger pad 710A at a certain time. In addition, a host device can warn if pre-specified devices are not in, say a charging bag 710B, when the user is walking outside the house "region." This may be accomplished by the designated region detector 770 notifying the charging bag 710B when the charging bag 710B is leaving the house. The charging bag 710B can then check its programming and state information about receiver devices 720 to determine which receiver devices 720 are present in the charging bag 710B and which receiver devices 720 are expected to be in the charging bag 710B. Based on this determination, the charging bag 710B may send a message to its notifier 260, the remote notifier 760, or a combination thereof to indicate whether all the expected devices are present or some of the expected devices are missing from the charging bag 710B.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus configured to transmit wireless power via a wireless field, the apparatus comprising:
    a transmit antenna for generating the wireless field;
    an amplifier coupled to the transmit antenna;
    a load sensing circuit coupled to the amplifier, the load sensing circuit configured to detect a change in power consumption by the amplifier;
    a communication interface configured to receive information about an identity of a device when the load sensing circuit indicates the device is within the wireless field, the indication based at least in part on the change in power consumption; and
    a controller configured to communicate information about the identity of the device based on the received information about the device.

2. The apparatus of claim 1, wherein:
    the load sensing circuit further coupled to the controller, the load sensing circuit further configured to generate a response signal to the controller representative of the changes in power consumption; and
    wherein the controller is further configured to determine, based in part on the response signal, at least one of a presence of another device within the wireless field or the information of the device previously indicated to be within the wireless field.

3. The apparatus of claim 1, further comprising a wireless communicator coupled to the controller, the wireless communicator configured to communicate with the device over a communication channel different from a wireless communication channel used to generate the wireless field, wherein the controller is further configured to monitor the information from the communication channel.

4. The apparatus of claim 3, further comprising another device with a receive antenna in the wireless field and wherein the communication channel is configured for a peer-to-peer communication between the device and the another device.

5. The apparatus of claim 3, wherein the different communication channel comprises a Bluetooth communication channel.

6. The apparatus of claim 1, wherein:
    the controller is further configured to monitor and process additional information about another device with a receive antenna in the wireless field to generate additional notification information.

7. The apparatus of claim 1, wherein the information includes at least one of a device type or a unique device identifier.

8. The apparatus of claim 1, further comprising at least one of a light, a display, and an auditory signaler, the at least one of a light, a display, or an auditory signaler coupled to the controller and configured to communicate the information provided by the controller.

9. The apparatus of claim 1, further comprising a memory coupled to the processor, the memory configured to store at least one of the information about the device or the notification information.

10. A power transmitting system, comprising:
    a host device, comprising:
        a transmit antenna configured to transmit a wireless field;
        an amplifier coupled to the transmit antenna;
        a load sensing circuit coupled to the amplifier, the load sensing circuit configured to detect a change in power consumption by the amplifier;
        a first communication interface configured to receive information about an identity of another device when the load sensing circuit indicates the another device is within the wireless field, the indication based at least in part on the change in power consumption; and
        a controller coupled to the transmit antenna and the communication interface, the controller configured to communicate notification information based on the received information about the identity of the another device; and
        a second communication interface configured to transmit the notification information to a remote device to present the notification information.

11. The power transmitting system of claim 10, further comprising a designated region detector coupled to the host device, the designated region detector configured to detect when the host device leaves a designated region.

12. The power transmitting system of claim 10, wherein the host device further comprises a notifier coupled to the controller, the notifier configured to communicate the notification information communicated by the controller.

13. The power transmitting system of claim 12, further comprising:
    a designated region detector coupled to the host device, the designated region detector configured to detect when the host device leaves a designated region; and
    wherein the controller is configured to:
        receive a signal from the designated region detector when the another device leaves the designated region; and
        indicate via the notifier if any device expected to be within the wireless field is missing when the host device leaves the designated region.

14. The power transmitting system of claim 10, wherein
    the load sensing circuit is further configured to generate a response signal to the controller representative of the changes in power consumption; and
    wherein the controller is further configured to determine, based in part on the response signal, at least one of a presence of another device in the wireless field for the first time or the information of any device previously determined to be present within the wireless field.

15. The power transmitting system of claim 10, wherein the information includes at least one of a device type or a unique device identifier.

16. The power transmitting system of claim 10, wherein the another device includes at least one of a display, an auditory signaler, a computer display, or a computer configured to display the notification information on a web-site.

17. The system of claim 10, wherein the first and second communication interfaces comprise Bluetooth communication interfaces.

18. A method, comprising:
  detecting a presence of a device with a receive antenna within an area covered by a wireless field;
  generating the wireless field at a resonant frequency of a transmit antenna of a host device upon detecting the presence of the device within the area covered by the wireless field;
  receiving a request for power from the device via a communication channel;
  receiving unique identifier information from the device via the communication channel;
  indicating notification information about the device on a notifier responsive to the unique identifier information; and
  stopping the generation of the wireless field when detecting the presence of a device within the area indicates an absence of devices within the area.

19. The method of claim 18, further comprising storing the unique identifier information on a memory of the host device including the transmit antenna.

20. The method of claim 18, further comprising:
  detecting a presence of another device with a receive antenna within the wireless field; and
  receiving additional unique identifier information from the another device.

21. The method of claim 20, further comprising storing the unique identifier information and the additional unique identifier information on a memory of the host device including the transmit antenna.

22. The method of claim 18, further comprising:
  identifying a device expected to be within the wireless field; and
  indicating via the notifier a presence of the device expected to be within the wireless field.

23. The method of claim 22, further comprising indicating via the notifier an absence of the device expected to be within the wireless field.

24. The method of claim 22, further comprising:
  indicating via the notifier an absence of the device expected to be within the wireless field if the device expected to be within the wireless field is not present in the wireless field during an expected time period; and
  wherein the identifying a device expected to be within the wireless field further comprises identifying the expected time period for the device expected to be within the wireless field.

25. The method of claim 22, further comprising indicating via the notifier when the host device leaves a designated region and the host device does not include the device expected to be within the wireless field.

26. The method of claim 18, further comprising:
  transmitting the notification information to a remote notifier that is remote from the transmit antenna, the remote notifier configured to:
  indicate the notification information about the device on the remote notifier.

27. The method of claim 18, further comprising indicating via the notifier when the host device leaves a designated region.

28. The method of claim 18, further comprising transmitting a signal to a remote notifier that is remote from the transmit antenna when the host device leaves a designated region.

29. The method of claim 18, wherein the communication channel comprises a Bluetooth communication channel.

30. An apparatus configured to transmit wireless power via a wireless field, the apparatus comprising:
  means for detecting a presence of a device with a receive antenna within an area covered by a wireless field;
  means for generating a wireless field at a resonant frequency of a transmit antenna of a host device upon detecting the presence of the device within the area covered by the wireless field;
  means for receiving a request for power from the device via a communication channel;
  means for receiving unique identifier information from the device via the communication channel; and
  means for indicating notification information about the device responsive to the unique identifier information, the means for generating the wireless field further configured to stop generating the wireless field when the means for detecting the presence of a device within the area indicates an absence of devices within the area.

31. The apparatus of claim 30, further comprising means for storing the unique identifier information on a memory of the host device including the transmit antenna.

32. The apparatus of claim 30,
  wherein the means for detecting are configured to detect a presence of another device with a receive antenna within the wireless field, and
  wherein the means for receiving unique identifier information are configured to receive additional unique identifier information from the another device.

33. The apparatus of claim 32, further comprising means for storing the unique identifier information and the additional unique identifier information on a memory of the host device including the transmit antenna.

34. The apparatus of claim 30, further comprising:
  means for identifying a device expected to be within the wireless field; and
  means for indicating a presence or an absence of the device expected to be within the wireless field.

35. The apparatus of claim 34, further comprising:
  means for indicating an absence of the device expected to be within the wireless field if the device expected to be within the wireless field is not present in the wireless field during an expected time period; and
  wherein the means for identifying a device comprises means for identifying the expected time period for the device expected to be within the wireless field.

36. The apparatus of claim 34, further comprising means for indicating to the user when the host device leaves a designated region and the host device does not include the device expected to be within the wireless field.

37. The apparatus of claim 30, further comprising means for indicating when the host device leaves a designated region.

38. The apparatus of claim 30, wherein the communication channel comprises a Bluetooth communication channel.

39. A computer readable storage medium including instructions executable by a processor of an apparatus to:
  detect a presence of a device with a receive antenna within an area covered by a wireless field;
  generate the wireless field at a resonant frequency of a transmit antenna when the device is detected within the area covered by the wireless field;
  receive a request for power from the device via a communication channel;
  receive unique identifier information from the device via the communication channel;

indicate notification information about the device responsive to the unique identifier information; and stop generating the wireless field when an absence of devices in the area covered by the wireless field is detected.

* * * * *